Aug. 4, 1964  K. SCHLESINGER  3,143,681
SPIRAL ELECTROSTATIC ELECTRON LENS
Filed Dec. 7, 1959  6 Sheets-Sheet 2
FIG.3.
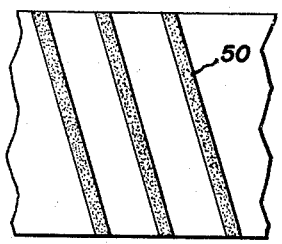
FIG.5.
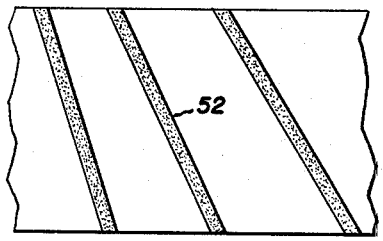
FIG.4.
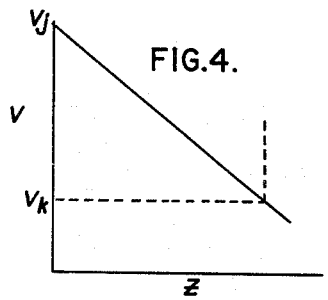
FIG.6.
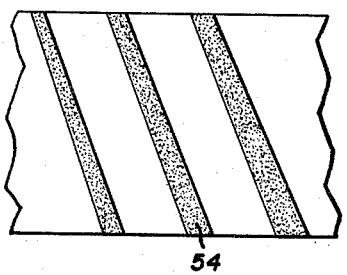
FIG.7.
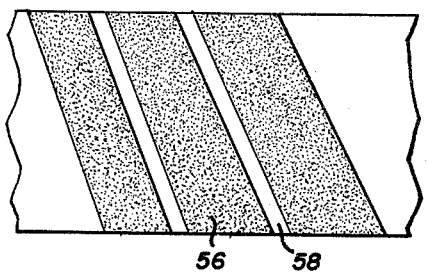
FIG.9.
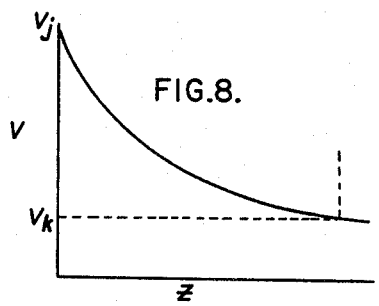
FIG.8.
INVENTOR:
KURT SCHLESINGER,
BY Robert J. Mooney
HIS ATTORNEY.

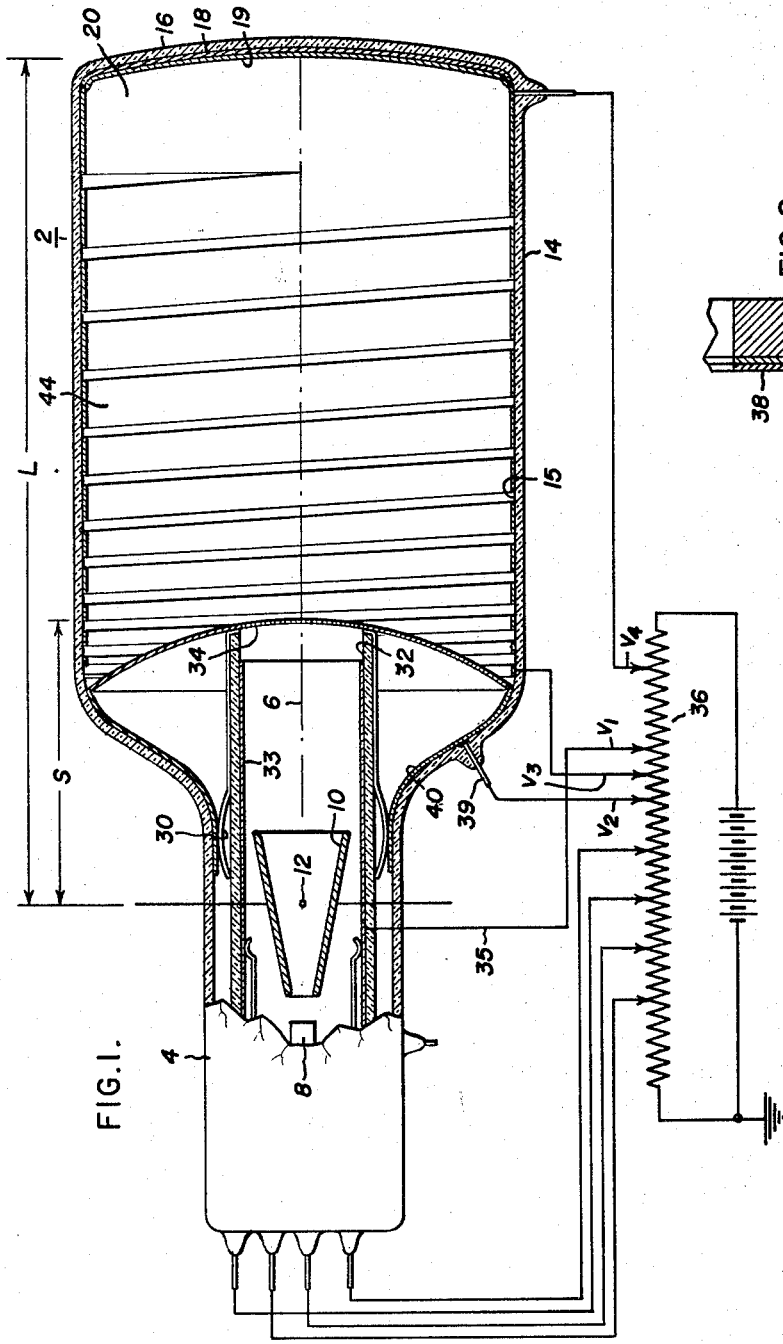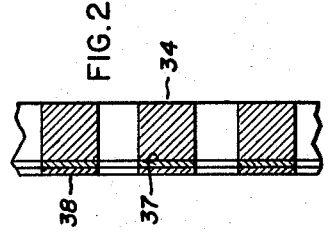

Aug. 4, 1964 K. SCHLESINGER 3,143,681
SPIRAL ELECTROSTATIC ELECTRON LENS
Filed Dec. 7, 1959 6 Sheets-Sheet 3

INVENTOR:
KURT SCHLESINGER,
BY Robert J. Mooney
HIS ATTORNEY.

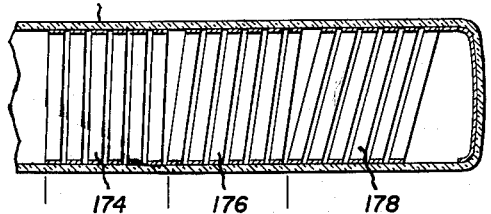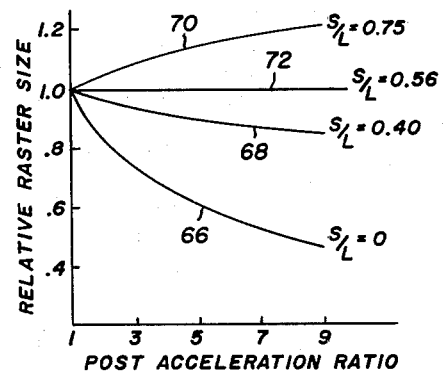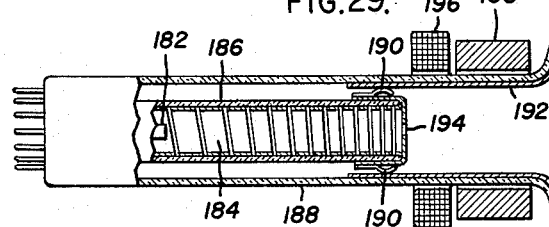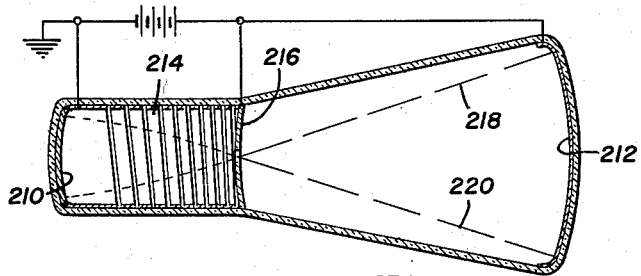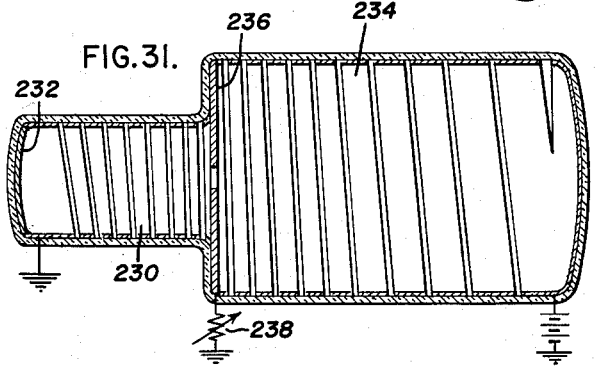

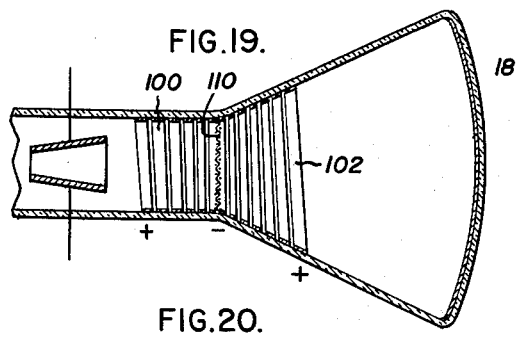
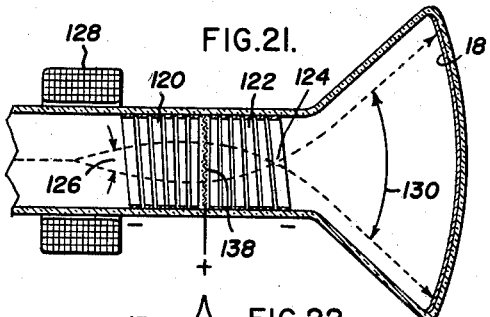
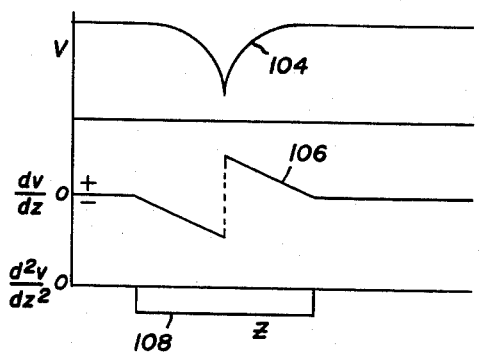
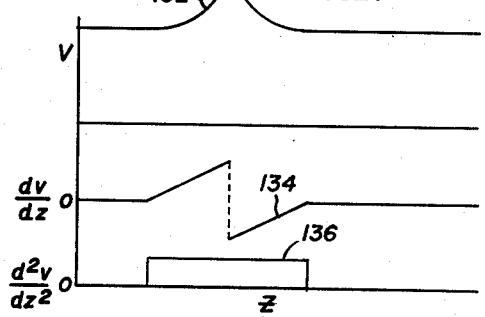
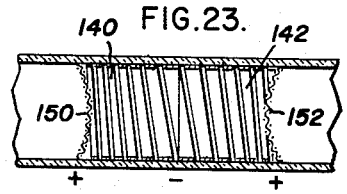
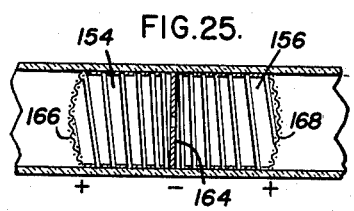
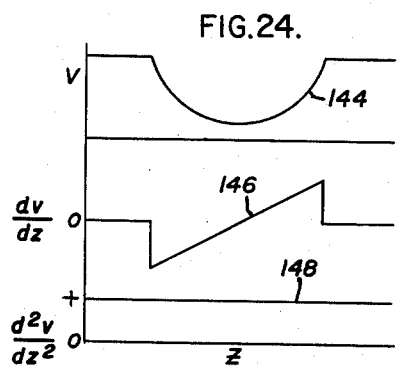
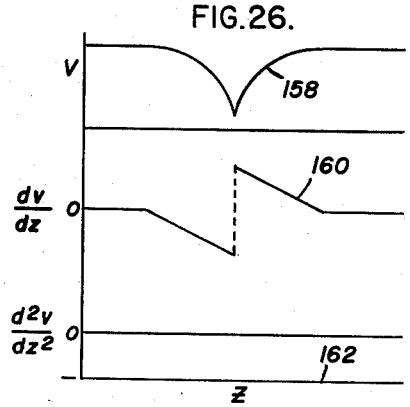

Aug. 4, 1964  K. SCHLESINGER  3,143,681
SPIRAL ELECTROSTATIC ELECTRON LENS
Filed Dec. 7, 1959  6 Sheets-Sheet 6
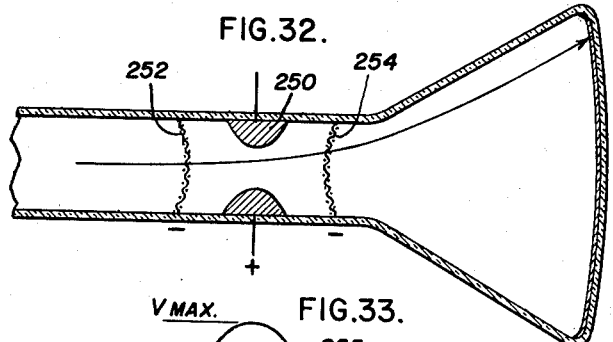
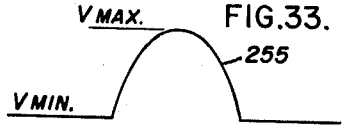
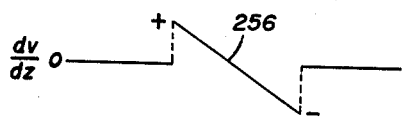
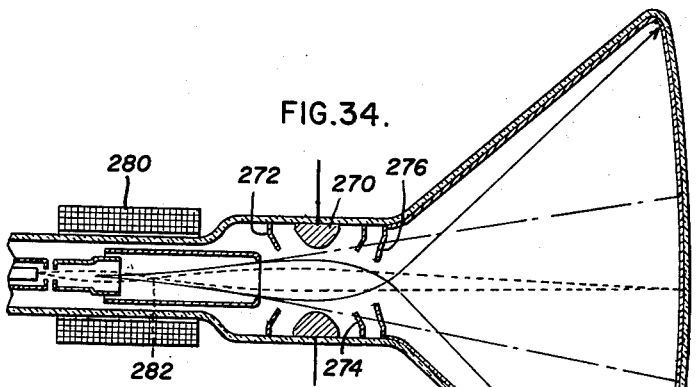
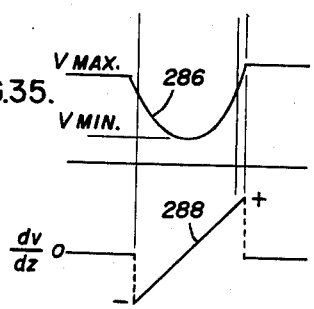
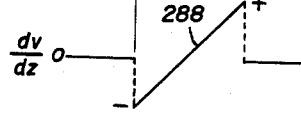
INVENTOR:
KURT SCHLESINGER,
BY Robert J. Mooney
HIS ATTORNEY.

United States Patent Office 3,143,681
Patented Aug. 4, 1964

3,143,681
SPIRAL ELECTROSTATIC ELECTRON LENS
Kurt Schlesinger, Fayetteville, N.Y., assignor to General Electric Company, a corporation of New York
Filed Dec. 7, 1959, Ser. No. 857,757
18 Claims. (Cl. 313—83)

The present invention relates to improvements in electron discharge devices of the electron beam type such as cathode ray tubes.

A principal object of the present invention is to provide an improved class of electron discharge devices of the electron beam type in which the functions of focusing, deflection, and beam acceleration and deceleration can be effectively controlled independently of each other, and, if desired, in the same space.

Another object is to provide a class of tubes of the foregoing type which are characterized by structural features which are relatively simple mechanically and require relatively few external potential source connections, and which are particularly suitable for scan magnification or image conversion.

Another object is to provide an improved cathode ray tube requiring substantially reduced deflection power for a given degree of post-acceleration, and capable of providing a large variation in degree of post-acceleration with substantially no change in raster size.

It can be shown mathematically that focusing of an electron beam having axial symmetry can be obtained with a minimum of spherical aberration by an electrostatic field having equipotential surfaces which are co-asymptotic hyperboloids of revolution rotationally symmetrical about the beam axis. When the second derivative of the field space potential at the axis with respect to displacement along the axis is negative in sign, the radial component of field strength or force on electrons in the field is positive in sign and by convention points away from the axis so as to produce a divergent lens action on an electron beam passing through the field. Conversely when the second derivative of the field space potential at the axis with respect to displacement along the axis is positive in sign, the radial force on electrons in the field is by convention toward the axis so as to produce a convergent lens action on an electron beam passing through the field.

According to my invention I have found that fields having such desirable hyperboloidal equipotential surfaces can be produced in electron beam discharge devices such as cathode ray tubes by arrangements which are relatively simple mechanically, which require few external potential source connections, and which can be readily combined in various arrays to produce with low aberration various desired electron beam focusing effects as well as desired acceleration, deflection, and image-formation effects. According to one aspect of my invention, I have found that a field having the desired hyperboloidal equipotential surfaces can be produced by a single electrode consisting of a continuous spiral conductor, which may or may not be self-supporting, disposed coaxially with a reference axis which may be the longitudinal axis of a cathode ray tube, and having a physical configuration and electrical resistance characteristics such as to produce a space potential at the reference axis which varies as a quadratic function of displacement along the reference axis. The variation in voltage along the spiral conductor may be provided in a number of ways, including for example varying the effective resistivity of the spiral conductor, varying its cross-sectional dimensions, varying its pitch, varying the proportion of turn width to turn spacing, or varying two or more of the foregoing factors in combination to provide a non-linear or non-uniform conductor. Additionally the desired voltage variation may be achieved by a series of stepped spirals, each step or increment being in itself linear but the aggregate having an overall non-linear effect, much as a curve can be approximated by a series of straight lines. Preferably, however, I vary both the pitch and the width of the spiral conductor to achieve the desired relation of voltage to displacement along the reference axis.

Further according to my invention, I have found that desired variations in field gradient, even abrupt changes such as may be required at the boundaries of a given lens region, can be obtained by providing, at the desired location of such change in field gradient, a physical field boundary element such as one or more transverse conductive surfaces sufficiently apertured to pass the electron beam yet providing a surface which is sufficiently continuous electrically to serve as a predetermined field boundary, and having a shape corresponding substantially to the contour of the desired adjacent field equipotential. Such a boundary element may be a planar conductive member, for example of sheet metal having, when the electron beam path is fixed, a single opening to pass the electron beam. Or it may be a foraminous member such as a mesh grid, of adequate transparency to minimize beam attenuation, in those cases where the beam path is subject to lateral displacement, as with variable beam deflection. Such boundary elements may also be arranged to manifest a potential difference between their opposite faces, when desired.

Still further in accordance with my invention I have found that such lens field generating means may be combined with suitable electron beam generating means, suitable beam deflecting means, and additional suitable field boundary defining means to provide a wide variety of electron beam tubes such as cathode ray image display tubes for widely varying purposes such as image intensification, scan magnification, high resolution, and the like.

In the drawings:
FIG. 1 is an axial sectional view of one embodiment of a cathode ray tube constructed according to the present invention;
FIG. 2 is an enlarged sectional view of a portion of the structure of FIG. 1;
FIG. 3 is a developed view of an electrode suitable with the present invention;
FIG. 4 is a graph of the potential distribution of the electrode of FIG. 3;
FIG. 5 is a developed view of another electrode suitable with the present invention;
FIG. 6 is a graph of potential on the electrode of FIG. 5;
FIG. 7 is another electrode suitable with the present invention;
FIG. 8 is a graph of potential on the electrode of FIG. 7;
FIG. 9 is still another electrode particularly suitable with the present invention;
FIG. 10 is a diminished fragmentary view of another portion of the structure of FIG. 1;
FIG. 11 is a graph of certain of the voltage relationships of the structure of FIG. 10;
FIG. 12 is a graph of certain characteristics of the structure of FIG. 1;
FIG. 13 is a diminished fragmentary view of a structure alternative to that of FIG. 10;
FIG. 14 is a graph of certain aspects of FIG. 13;
FIG. 15 is a diminished fragmentary view of another alternative to the structure of FIG. 10;
FIG. 16 is a graph of certain aspects of FIG. 15;
FIG. 17 is another structural alternative to that of FIG. 10;

FIG. 19 is an alternative embodiment of the present invention;

FIG. 20 is a graph relative to FIG. 19;

FIG. 21 is another alternative embodiment of the present invention;

FIG. 22 is a graph relative to FIG. 21;

FIG. 23 is still another embodiment;

FIG. 24 is a graph relative to FIG. 22;

FIG. 25 is a further embodiment;

FIG. 26 is a graph relative to FIG. 25;

FIG. 27 is a still further embodiment;

FIG. 28 is a graph relative to FIG. 27;

FIG. 29 is still another embodiment;

FIG. 30 is an image tube constructed according to the invention;

FIG. 31 is another image tube according to the invention;

FIG. 32 is another embodiment of the invention;

FIG. 33 is a graph related to FIG. 32;

FIG. 34 is a scan magnifier constructed according to the invention;

FIG. 35 is a graph related to FIG. 34.

Figure 10:
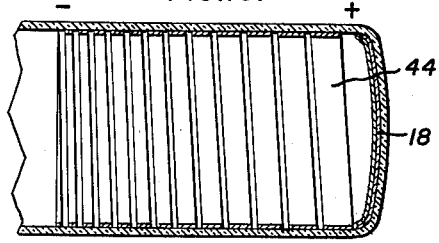

Various types of electron beam tubes constructed according to the present invention, and employing electron beam focusing lenses of both the diverging and converging type, will now be described in detail.

Considering first structures having lenses of the diverging type, and referring to FIG. 1, there is shown a cathode ray tube constructed in accordance with my invention which includes an envelope 2 including a neck portion 4 coaxial with a central reference axis 6 extending in the Z coordinate direction and enclosing a suitable electron gun 8 which provides a coaxial electron beam. Within the neck is also situated suitable electron beam deflection means 10, which may be magnetic but is here shown by way of example as electrostatic, and which provides deflection of the electron beam in mutually perpendicular X and Y coordinates with respect to the Z axis 6 from an effective center of deflection 12 on the axis 6. The envelope 2 also includes an enlarged post-deflection or funnel portion 14 including a cylindrical wall 15 coaxial with the reference axis 6 and closed at its forward end by a faceplate 16 disposed transverse to the reference axis. On the interior surface of the faceplate is an electron beam target 18 which may be a suitable cathodo-luminescent screen, provided, if desired, with a light-reflective metal coating 19.

For a purpose hereinafter to be described, there is coaxially supported in the neck 4 of the envelope, as by conductive fingers 30, a tubular member 32 of insulating material which extends rearwardly to the vicinity of the deflection means 10 and extends forward slightly into the enlarged diameter post deflection region 14. Tubular member 32 has an interior conductive surface 33 which is connected by lead 35 to a potential $V_1$ in power supply 36 corresponding to the final anode potential of the electron gun 8. Supported by and closing the forward end of the tubular member 32 is a field boundary element in the form of an electron beam transparent mask member 34 disposed generally transverse to the reference axis 6 and consisting of a conductive foraminate sheet or mesh.

When it is preferred to inhibit flow, through the mask 34, of secondary electrons generated by the electron beam hitting the mask, as best shown in the enlarged fragmentary sectional view of FIG. 2, the surface of mask 34 facing rearwardly into tubular member 32 may have a non-conductive coating 37 on top of which is a layer of conductive material 38 preferably characterized by good secondary electron emissivity, such as for example magnesium oxide. Layer 38 thus electrically charges during operation of the tube to the potential $V_1$ of the adjacent interior surface of tubular member 32. In contrast to the potential $V_1$, the forward or screenward facing surface of the member 3 is connected, by lead 39 and the interior conductive coating 40 at the rearward end of the post-deflection region 14, to a potential $V_2$ which is preferably a few volts, for example 30 to 100 volts, negative relative to potential $V_1$. Thus secondary electrons are repelled rearwardly by the bias $V_1-V_2$.

Adjacent to and preferably supported by the cylindrical interior wall of the post-deflection portion 14 of the envelope 2 is a spiral electrode consisting of a conductor 44, which may be a conductive strip or coating, coaxial with the reference axis 6. The spiral conductor 44 extends from adjacent target 18 rearwardly along substantially the entire length of envelope portion 14 and is connected at its rearward end to a potential $V_3$ which may be the same as potential $V_2$. The relation of potentials $V_3$ and $V_2$ depends on the relative axial position of mask 34 and the rearward end of spiral 44 and preferably should be such that the mask potential $V_2$ conforms to the potential of the coincident equipotential surface of the electrostatic field developed by the spiral electrode 44. Also preferably the spiral 44 should overlap the tube 32 by a distance $$s = \frac{D^2}{16t}$$

where D is the screen diameter and $t$ is the spacing along axis 6 of screen 18 and mask 34.

The forward end of the spiral 44 is connected to a potential $V_4$, which may be equal to the potential of target 18 and is substantially more positive than potential $V_2$. The forward end of the spiral is preferably spaced from the screen by a conductive coating 20 which has an axial dimension of about 0.36D, where D is the screen diameter. The conductive coating forming the spiral conductor 44 may be of any suitable material such as finely divided graphite mixed with an inert filler and a suitable binder such as potassium silicate, and having a sufficiently high total resistance as to avoid excessive current drain on the power supply 36 as well as excessive dissipation of heat. Such spiral conductive coatings can be put in place in a number of ways, for example by photographic or photoresist methods, or mechanically by removing from a continuous conductive coating a strip of desired width and pitch.

In accordance with my invention, the spiral conductor 44 is arranged to have a potential varying along its length such as to generate an electrostatic field having a space potential on the axis 6 which varies according to the function $$V = V_3 + (V_4 - V_3)\left[\frac{2z}{l} - (z/l)^2\right] \quad (1)$$

where $l$ is the total axial length of the spiral 44 measured along the axis 6, and $z$ is displacement in the axial direction from an initial position corresponding to the intersection of mask 34 with axis 6. From Equation 1 above, the actual potential desired at any point along spiral conductor 44 may be computed, by application of the equation well known to those skilled in the art, for the space potential U at any point at a radius $r$ from an axis Z in an electrostatic field rotationally symmetrical about the axis. The mentioned well known equation is $$U_{r,z} = V - \frac{r^2}{4}\left(\frac{d^2V}{dz^2}\right) \quad (2)$$

where V is the potential along the Z axis.

It has already been pointed out that any desired variation of voltage along a spiral electrode such as electrode 44 may be achieved in several ways, such as for example varying the resistivity of the spiral conductor, varying its pitch, varying its cross-sectional dimensions, or varying two or more of the foregoing factors in combination. For a better understanding of the manner in which the potential at any point along a spiral electrode may be controlled by controlling, for example, the pitch and/or width of the spiral, reference is made to FIGURES 3 through 9. In FIG. 3 there is shown a developed view of a cylindrical spiral electrode, the spiral conductor being a strip of material such as conductive paint, designated 50. The strip 50 is of constant width and has a constant pitch, and for a voltage $V_j$ applied at one end of the spiral and a voltage $V_k$ at the other end it will be observed in the corresponding graph of FIG. 4 that the voltage drop along the spiral is a straight line function of the axial displacement Z. FIG. 5 shows a developed view of a spiral electrode similar to that of FIG. 3 except that the pitch of the successive turns 52 progressively increases. Correspondingly, as will be evident from the graph of FIG. 6, the voltage drop per unit of displacement along the Z axis progressively decreases with increasing pitch, since the resistance of the spiral per unit of displacement along the Z axis decreases with increasing pitch. Again in FIG. 7 there is shown a developed view of a spiral electrode having a constant pitch but wherein the spiral conductor itself 54 progressively increases in width. It will be apparent from the graph of FIG. 8 that when the width of the conductor is smallest the resistance drop per turn is greatest, and so the voltage drop per turn at the small width end of the spiral is greater than the voltage drop per turn at the large width end of the spiral. Thus it will be evident that any desired relationship of voltage to displacement along the spiral can be obtained by varying the width and/or pitch of the spiral conductor. It will likewise be recognized by those skilled in the art that these relationships apply not only to spirals of cylindrical configuration, as illustrated, but also to conical spirals or spirals conforming to other figures of revolution.

Particularly advantageous for providing large changes of voltage gradient with pitch is a spiral electrode in which both width and pitch vary in the same direction. Such a spiral is shown in FIG. 1, and in developed view at 56 in FIG. 9, and is characterized by a gap or spacing 58 of constant width between turns of the conductive material, with the gap having a variable pitch. Such a spiral is easily formed by removing from a continuous coating a strip of constant width and variable pitch, and hence may be termed a "white" spiral. Such a "white" spiral also has a minimum amount of substrate not covered by conductive material, and hence minimizes problems of electrical charging of the areas not covered.

Recognizing that, as illustrated above, any desired relation of voltage to displacement along the reference Z axis can be obtained with a suitable spiral electrode it will be evident that, except for extraneous effects at a field boundary which will be dealth with more fully hereinafter, in an axially symmetrical electrostatic field generated by such a spiral electrode a desired relationship of space potential at the Z axis to displacement along the Z axis can be obtained by application of Equation 2 above.

Figure 11:
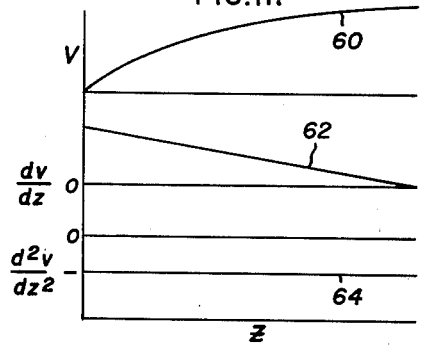

For a better understanding of the relationship of spiral conductor 44 of FIG. 1 to the electrostatic field generated thereby, reference is made to FIG. 10 which shows for simplicity and in reduced scale only the spiral conductor portion of the tube of FIG. 1. It will be observed that the pitch of the spiral electrode of FIG. 10 decreases toward the screenward end of the tube. Thus the number of turns per unit length (turn density) along the Z axis 6 is lower at the screenward or forward end of the envelope portion 14 than at its rearward end. The number of turns per unit Z being greater at the rearward end of the spiral, the voltage drop per unit Z in the spiral is greater at its rearward end. This is illustrated in the graph of FIG. 11 which shows in curve 60 the potential along the axis of spiral conductor 44 plotted as ordinate against the displacement Z plotted as abscissa, according to Equation 1. The curve 62 shows the first derivative of the space potential along the Z axis of spiral conductor 44 with respect to Z, plotted against Z, and the curve 64 shows the second derivative of this axial potential with respect to Z, plotted against Z. From curves 62 and 64 it will be evident that the first derivative has a negative slope and the second derivative is negative in sign, and accordingly the spiral conductor 44 in the structure of FIG. 1 produces a lens field which has a divergent lens action.

In accordance with the present invention it has been found that wherever the voltage gradient of the field along the axis Z, i.e. the first derivative of voltage with respect to Z, undergoes an abrupt discontinuity, such as at the left hand extremity of curve 62 of FIG. 11, to avoid deleterious effects on lens action at such a point in the electrostatic field, it is desirable to provide there a field boundary element of predetermined shape and location. Such a boundary element should be conductive, be adequately transparent to the electron beam, and have a shape substantially conforming to the shape of the desired field equipotential at the location of the field gradient discontinuity. Mask 34 serves this purpose in the tube of FIG. 1, the foraminate character of the mask affording a high degree of transparency to the electron beam while the conductive forwardly facing surface of the mask is sufficiently electrically continuous to establish a boundary surface of predetermined shape corresponding to the coincident hyperbolic field equipotential surface at the location of the mask.

Since, as has been shown, the cylindrical spiral anode 44 of FIG. 1 produces a diverging lens action, the structure of FIG. 1 has the important advantage that the electron beam is given a post deflection acceleration for added output brightness and also the diverging action of the lens counteracts the converging action which would normally be expected in a post-acceleration field. Thus increased display brightness may be achieved by post acceleration, or conversely, for a given brightness level deflection of the beam may be obtained at lower beam velocity, correspondingly reducing deflection power and increasing deflection sensitivity, without the reduction of picture size normally incurred with post-acceleration.

It has also been found that the extent to which the diverging action of the lens of FIG. 1 will make itself felt depends somewhat upon the length of the drift space S from the center of deflection 12 to the rearward end of the lens field as defined by the mask 34. FIG. 12 shows this in a graph of relative raster size plotted as ordinate against post acceleration ratio plotted as abscissa. The curves 66, 68, 70 and 72 correspond to different values of the ratio $S/L$, where S is the axial distance between center of deflection 12 and mask 34 and L is the axial distance between the center of deflection and target 18. It has been found that as $S/L$ approaches about 0.56, as shown by curve 72, no raster shrinkage occurs even over a wide variation of post acceleration ratio, and when $S/L$ is greater than 0.56 as shown by curve 70 the divergent lens action is sufficiently pronounced as to increase the raster size even with increasing post acceleration ratio.

It has been found that in a tube built and tested, corresponding substantially to the structure shown in FIG. 1, and having a value for $S/L$ of 0.56, the ultimate anode voltage $V_4$ could be varied from 1 times final gun electrode voltage $V_1$ to 25 times final gun electrode voltage i.e. a change in post acceleration ratio of from 1 to 25, without any variation in raster size. Moreover the diverging lens action prevents the lenticular action of the openings in mask 34 from focusing an image of the mask on the screen.

Figure 13:
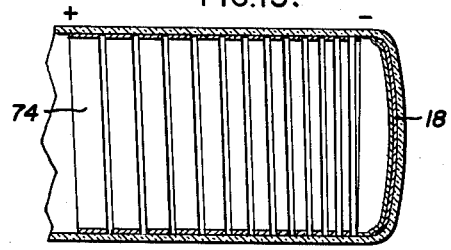
Figure 14:
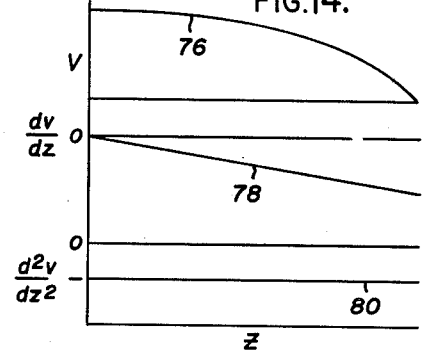

FIG. 13 is similar to FIG. 10 but shows a spiral electrode 74 of alternative form having a divergent lens action. In FIG. 13 the turn-density, or reciprocal of pitch, of the spiral 74 increases toward the target 18 and the spiral voltage decreases toward the target, serving to decelerate the electron beam. The potential at the Z axis as a function of displacement along the Z axis, first derivative of such potential with respect to such displacement, and second derivative thereof are shown in FIG. 14 in curves 76, 78, 80 respectively. From FIG. 14 it will be evident that the first derivative has a negative slope and the second derivative is negative, providing the desired divergent lens action.

Figure 15:
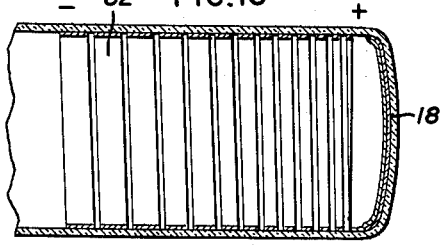
Figure 16:
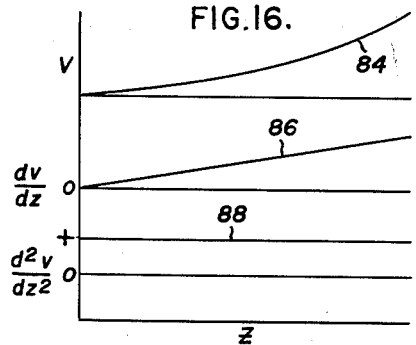

FIG. 15 is similar to FIG. 13 but shows an alternative form of spiral electrode 82 having a convergent lens action. In FIG. 15 the turn density increases toward the target 18 and the spiral voltage increases toward the target. The potential at the Z axis as a function of displacement along the Z axis, positively sloping first derivative of such potential with respect to such displacement, and positive second derivative are shown by curves 84, 86, 88 respectively in FIG. 16. It will be noted that the second derivative is positive, providing the desired convergent lens action.

Figure 17:
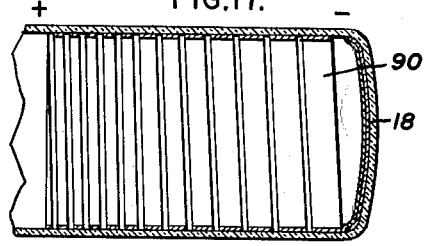
Figure 18:
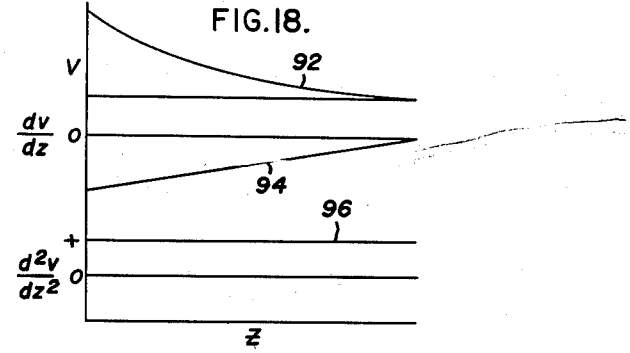
FIG. 18 is a graph of certain aspects of FIG. 17.

FIG. 17 is similar to FIG. 15 but shows an alternative form of spiral electrode 90 having a convergent lens action. In the structure of FIG. 17 the spiral voltage decreases toward the target 18, serving to decelerate the electron beam, and the spiral turn-density decreases toward the target. The potential at the axis as a function of Z, positively sloping first derivative and positive second derivative are shown in curves 92, 94, 96 respectively in FIG. 18. It will be noted that the second derivative is positive, providing the desired convergent lens action.

It is also within the contemplation of the present invention that a non-linear spiral electrode for generating an electrostatic field having the desired lens action and velocity changing action may be provided on an axially symmetrical surface of locus other than cylindrical, such as for example a cone or other figure of revolution. FIG. 19 is a fragmentary view of a structure similar to that of FIG. 1 except that the electron beam after deflection by the deflecting means 10 passes through a region bounded by a non-linear spiral electrode 100 of cylindrical locus having both pitch and potential decreasing toward the target 18, and then enters a region bounded by a non-linear spiral electrode 102 supported by a conical surface and having a pitch and a potential increasing toward the target 18. When a spiral electrode is arranged on a conical surface, the voltage drop per turn tends to be less at the small end of the cone because the circumferential length of each turn there is less than the length of a turn at the larger end of the cone.

FIG. 20 is a graph related to the structure of FIG. 19 showing in curve 104 the potential along the Z axis of the tube, in curve 106 the first derivative of the potential at the axis with respect to Z and in curve 108 the second derivative of the potential at the axis with respect to Z. It will be evident from curve 106 that the first derivative undergoes an abrupt discontinuity, shifting from negative to positive in sign at a point along the Z axis corresponding to the junction of the cylindrical spiral anode with the conical spiral anode. To avoid deleterious effects on focusing action at the boundary of the fields of electrodes 100 and 102 a field boundary determining mask 110 similar to mask 34 is disposed transverse to the Z axis between the fields and maintained at a potential equal to the minimum potential shown in curve 104. To inhibit flow of secondary electrons, the mask 110 may have a multilayer construction such as mask 34, with a small bias between its opposite faces.

It may be observed from FIGS. 19 and 20 that the cylindrical spiral electrode 100 serves as a decelerating diverging lens and the conical spiral electrode 102 serves as an accelerating diverging lens thereby providing scan magnification without appreciable net change in beam velocity.

Such lenses as heretofore described may be employed not only in the post-deflection region of a tube, but also in the predeflection region, for example by providing appropriate coatings on the wall of a tube neck, to provide desired predeflection focusing or electron beam velocity variation.

It is further within the contemplation of the present invention that other various combinations of such lenses as heretofore described can be made in order to achieve various desired results. Where scan magnification is desired, for example, a pair of convergent lenses may be provided as shown at 120 and 122 in FIG. 21 to produce a real crossover at 124 ahead of the screen, with the resulting increase in deflection angle from angle 126 provided by conventional deflecting means 128 to angle 130. FIG. 22 shows graphically in curves 132, 134 and 136 respectively the potential distribution along the Z axis, positively sloping first derivatives, and positive second derivatives of potential with respect to displacement along the Z axis, of the structure of FIG. 21. To avoid deleterious effects on the desired lens action, a mesh grid 138 in all structural respects similar to the grid 110 of FIG. 19 is provided in FIG. 21 at the junction of the accelerating field region and the decelerating field region.

FIG. 23 shows another lens combination in which two cylindrical spiral lenses are arranged back to back. The decelerating action of the decreasing potential of the left hand electrode portion 140 is opposed by the accelerating action of the increasing potential of the right hand portion 142 so that there is no net change in velocity of an electron beam passing through the structure of FIG. 23. However as will be evident from the graphs of corresponding axis voltage, voltage gradient, and second derivative shown by respective curves 144, 146 and 148 in FIG. 24 the lens region 140 is converging and the lens region 142 is likewise converging, the complete combination thereby producing an enhanced convergence action.

As will also be noted from FIG. 23, to take care of the discontinuity in voltage gradient at the ends of the two lens regions 140, 142, transverse conductive masks 150, 152, having their surface somewhat saucer shaped to conform to the shape of the hyperbolic field equipotentials of the lens portions 140, 142, may be employed.

FIG. 25 shows another lens combination similar to FIG. 23 except that the first lens region 154 is decelerating and diverging and the second lens region 156 is accelerating and diverging, so that there is no net change in velocity of an electron beam passing through the structure of FIG. 25 but the lens combination produces an enhanced divergence action. Curves 158, 160 and 162 in the graph of FIG. 26 show the corresponding voltage, voltage gradient and second derivative of voltage with respect to Z in the lens combination of FIG. 25. To take care of the abrupt discontinuity in voltage gradient at the junction of the two lens regions 154, 156 there is provided between them a mask 164 which may be similar to mask 138 or may be an apertured plate as shown. The ends of the lens regions may likewise be closed by boundary elements 166, 168 convex outward in shape so as to conform to the shape of the hyperbolic field equipotentials.

Where structural simplicity is a primary requisite, this can be obtained at a minimum expense in lens efficiency by a spiral anode configuration which is not continuously smoothly varying but rather progresses in discrete steps, much as a curve can be approximated by a series of straight lines. The individual steps may in fact, for further simplicity, be each a spiral of uniform pitch, the field of each blending with those of its neighbors to produce an aggregate field which represents a step by step approximation to the theoretically optimum continuously varying field. Such a structure is shown in the fragmentary view of FIG. 27 wherein the cylindrical envelope wall 172 of the post-deflection region of a cathode ray tube is provided with a single continuous spiral conductor which is of constant cross-sectional dimension and hence constant resistance per unit length of conductor throughout but has a first section 174 of low pitch, a second section 176 of intermediate pitch, and a third section 178 of high pitch. FIG. 28 shows the different voltage gradients of the three spiral sections, and illustrates the manner in which a continuously smoothly varying voltage gradient, characteristic of a continuously smoothly varying nonlinear spiral, can be approximated.

FIG. 29 shows a tube constructed according to the invention for very high resolution. A suitable electron gun 182 delivers an axial electron beam to a spiral lens 184 situated on the interior surface of a tubular member 186 in the neck section 188, the spiral lens 184 being of the "white" spiral type and provided as a conductive coating on the interior surface of a tube of insulative material disposed coaxially in the neck. The rearward end of the lens 184 is maintained at the potential of the final electrode of the electron gun, while the forward end of the lens is connected by fingers 190 and internal conductive coating 192 to the luminescent screen potential. The object plane of the lens is the plane of the exit aperture for the electron beam at the exit end of the electron gun 182. The lens serves to collimate the electron beam and focus it at the axial exit aperture 194 of the lens section. The electron beam may then be subject to conventional focusing and deflection action for example by a suitable focusing coil 196 and deflection yoke 198 disposed externally of the forward end of the tube neck.

FIG. 30 shows a tube employing a non-linear spiral lens constructed according to the present invention and suitable for image conversion. The tube includes an image developing member 210, which may be for example a photo-cathode, and a screen or target 212 adapted to be impinged by electrons emitted by the member 210 in accordance with an optical image impressed on the photo-cathode. A cylindrical non-linear spiral electrode 214 is provided between the image developing member 210 and a centrally apertured transversely disposed mask member 216 having a shape conforming to the shape of the adjacent hyperbolic field equipotential developed by electrode 214. As shown the spiral electrode is of the accelerating converging type, and thereby serves to enhance the brightness of the image generated at target 212, as well as provide image size magnification, as shown by electron paths 218 and 220.

FIG. 31 shows another type of image converter tube similar to that of FIG. 30 and using two spiral lenses in combination, the first lens 230 being disposed adjacent a photo-cathode 232 and being of the accelerating converging type, and the second lens 234 being of the decelerating converging type. An apertured mask 236 separates the two lenses. This provides a tandem convergence action similar to the structure of FIG. 21, providing a real crossover ahead of the screen and thereby giving image magnification. Adjustment of magnification of the device may be conveniently effected for example by adjusting the potential at the rearward end of the forward lens 234 by any suitable means, such as the variable resistor 238.

I have also found that the desired hyperbolic fields for either a divergent or convergent lens having desired accelerating or decelerating characteristics may be obtained by the use of electrodes having surfaces of uniform potential and toroidal shape coaxial with the desired reference axis, wherein the inwardly facing surface of the toroid has a coasymptotic hyperbolic cross-section. One example of a diverging lens employing such a structure is shown in FIG. 32 wherein the electrode 250 is of toroidal hyperbolic shape as shown. The field boundaries are closed by masks 252 and 254 conforming in shape to the hyperbolic equipotential surfaces of the field. FIG. 33 shows at 255 the voltage relationship along the axis of the structure of FIG. 32 resulting from maintaining the electrode 250 at a constant potential more positive than masks 252 and 254, and also shows at 256 the first derivative of voltage with respect to displacement along the Z axis.

FIG. 34 is another example of a convergent lens focusing field for scan magnification in which a toroidal hyperbolic electrode 270 is used, together with boundary masks 272 and 274, and an additional intermediate mask 276 conforming to the hyperbolic shapes of the adjacent field equipotential surfaces. Initial beam deflection is produced for example by coil 280, the beam being brought to a relatively sharp focus at a second crossover point 282 within coil 280, with a substantial increase in deflection angle being provided by the hyperbolic lens. FIG. 35 shows at 286 the voltage relationship of electrode 270 and masks 272, 274, 276, together with the first derivative at 288 of voltage along the Z axis.

The structure of FIG. 32 provides a divergent lens whereas the structure of FIG. 34 provides a convergent lens and is particularly useful for scan magnification. In both the structures of FIG. 32 and FIG. 34 the toroidal hyperbolic electrode has the particular advantage of occupying a minimal volume, and saving space particularly in the axial direction.

It will be appreciated by those skilled in the art that the invention may be carried out in various ways and may take various forms and embodiments other than those illustrative embodiments heretofore described. It is therefore to be understood that the scope of the invention is not limited by the details of the foregoing description, but will be defined in the following claims.

What I claim as new and desire to secure by Letters Patent of the United States is:

1. In an electron beam tube, means for generating an electron beam directed along a reference axis, first non-linear spiral electrode means surrounding the axis for generating a first electrostatic field having equipotential surfaces which are coasymptotic hyperboloids symmetrical with said axis, second non-linear spiral electrode means surrounding the axis for generating a second electrostatic field having equipotential surfaces which are coasymptotic hyperboloids symmetrical with said axis, and electron beam-transparent conductive field boundary means disposed transverse to the path of said electron beam between said first and second electrode means.

2. In an electron beam tube, means for generating an electron beam directed along a reference axis, first non-linear spiral electrode means surrounding the axis for generating a first electrostatic field having equipotential surfaces which are coasymptotic hyperboloids symmetrical with said axis, second non-linear spiral electrode means surrounding the axis for generating a second electrostatic field having equipotential surfaces which are coasymptotic hyperboloids symmetrical with said axis, and an electron beam transparent conductive field boundary member disposed transverse to the path of said electron beam between said first and second electrode means, said conductive member having respective surfaces facing said respective electrostatic fields, each of said respective surfaces conforming in shape to the adjacent equipotential surface of the respective field faced thereby.

3. In an electron optics beam tube, means for generating an electron beam directed along a reference axis, first non-linear spiral electrode means surrounding the axis for generating a first electrostatic field having equipotential surfaces which are coasymptotic hyperboloids symmetrical with said axis, second non-linear spiral electrode means surrounding the axis for generating a second electrostatic field having equipotential surfaces which are coasymptotic hyperboloids symmetrical with said axis, said first and second electrode means being axially spaced to form an electron drift space between said first and second fields, a first electron beam transparent conductive field boundary member disposed transverse to the path of said electron beam between said first electrode means and said drift space and conforming in shape to the adjacent equipotential surface of the respective field faced thereby, and a second electron beam transparent conductive boundary member disposed transverse to the path of said electron beam between said drift space and said second electrode means and conforming in shape to the adjacent equipotential surface of the respective field faced thereby, said electrodes providing upon application of voltage potential thereto a voltage profile along said reference axis substantially approximating a parabolic curve.

4. In an electron beam tube having an electron beam source and a target spaced from said source along a reference axis, an envelope enclosing said target and source and having a wall symmetrical with said axis, first cylindrical non-linear spiral electrode means on said wall forming a first electrostatic field within said envelope having equipotential surfaces which are coasymptotic hyperboloids symmetrical with said axis, second cylindrical non-linear spiral electrode means on said wall forming a second electrostatic field within said envelope axially contiguous to said first field and having equipotential surfaces which are coasymptotic hyperboloids symmetrical with said axis, and an electron beam-transparent conductive member disposed transverse to said axis between said first and second fields, said conductive member having respective surfaces facing said respective fields, each of said respective surfaces conforming in shape to the adjacent equipotential surface of the respective field faced thereby.

5. In an electron beam tube having an electron beam source and a target spaced from said source along a reference axis, an envelope enclosing said target and source and having a wall symmetrical with said axis, first electrode means on said wall forming a first electrostatic field within said envelope having equipotential surfaces which are coasymptotic hyperboloids symmetrical with said axis, second electrode means on said wall forming a second electrostatic field within said envelope axially contiguous to said first field and having equipotential surfaces which are coasymptotic hyperboloids symmetrical with said axis, each of said electrode means comprising a spiral conductive strip having a varying pitch and a substantially constant spacing between successive turns thereof, and an electron beam-transparent conductive member disposed transverse to said axis between said first and second fields, said conductive member having respective surfaces facing said respective fields, each of said respective surfaces conforming in shape to the adjacent equipotential surface of the respective field faced thereby.

6. In an electron beam tube having an electron beam source and a target spaced from said source along a reference axis, an envelope including said target and source and having a wall symmetrical with said axis, first electrode means on said wall forming a first electrostatic field within said envelope having equipotential surfaces which are coasymptotic hyperboloids symmetrical with said axis, second electrode means on said wall forming a second electrostatic field within said envelope having equipotential surfaces which are coasymptotic hyperboloids symmetrical with said axis, each of said electrode means comprising a spiral conductive strip having a varying pitch and a substantially constant spacing between successive turns thereof, said electrode means being axially spaced to form a drift space therebetween, a first electron beam transparent conductive member disposed transverse to said axis between said first field and said drift space and a second electron beam transparent conductive member disposed transverse to said axis between said second field and said drift space.

7. In an electron beam tube for scan magnification having an electron beam source and a target spaced from said source along a reference axis and means for deflecting the electron beam orthogonally relative to said axis, an envelope enclosing said target and source and having a wall surrounding said axis, first electrode means on said wall forming a first electrostatic field within said envelope having equipotential surfaces which are coasymptotic hyperboloids symmetrical with said axis, second electrode means on said wall forming a second electrostatic field with said envelope axially contiguous to said first field and having equipotential surfaces which are coasymptotic hyperboloids symmetrical with said axis, each of said electrostatic fields having a space potential at said reference axis the variation of which as a function of displacement along said reference axis toward said target is characterized by a positively sloping first derivative and a constant positive second derivative, and an electron beam-transparent conductive member disposed transverse to said axis between said first and second fields, said conductive member having respective surfaces facing said respective fields, each of said respective surfaces conforming a shape to the adjacent equipotential surface of the respective field faced thereby.

8. In an electron beam tube for scan magnification having an electron beam source and a target spaced from said source along a reference axis and means for deflecting the electron beam orthogonally relative to said axis, an envelope enclosing said target and source and having a wall surrounding said axis, first electrode means on said wall forming a first electrostatic field within said envelope having equipotential surfaces which are coasymptotic hyperboloids symmetrical with said axis, second electrode means on said wall forming a second electrostatic field with said envelope axially contiguous to said first field and having equipotential surfaces which are coasymptotic hyperboloids symmetrical with said axis, each of said electrostatic fields having a space potential at said reference axis the variation of which as a function of displacement along said reference axis toward said target is characterized by a negatively sloping first derivative and a constant negative second derivative, and an electron beam-transparent conductive member disposed transverse to said axis between said first and second fields, said conductive member having respective surfaces facing said respective fields, each of said respective surfaces conforming in shape to the adjacent equipotential surface of the respective field faced thereby.

9. In an electron beam tube having an electron beam source and a target spaced from said source along a reference axis, an envelope enclosing said target and source and having a wall symmetrical with said axis, electrode means on said wall forming a pair of contiguous electrostatic fields within said envelope each having equipotential surfaces which are coasymptotic hyperboloids symmetrical with said axis, one of said electrostatic fields having a space potential at said reference axis which varies with the displacement along said reference axis with a positively sloping first derivative and a constant second derivative, the other of said electrostatic fields having a space potential at said reference axis which varies as a function of displacement along said reference axis with a negatively sloping first derivative and a constant second derivative, and an electron beam transparent conductive member disposed transverse to said axis between said pair of fields, said conductive member forming a pre-determined boundary for each of said fields.

10. In a cathode ray tube, means for generating an electron beam directed along a reference axis, means for deflecting the electron beam in directions normal to the axis, electrode means surrounding the axis for generating an electrostatic field having equipotential surfaces which are cosymptotic hyperboloids symmetrical with the axis, said electrode means including a continuous spiral conductive strip symmetrical with the axis and having a non-uniform pitch, and an apertured electron beam conductive member having a substantially uniform surface potential disposed in the path of the electron beam between the deflection means and said electrostatic field, said conductive member conforming in shape generally to the adjacent hyperboloidal equipotential surface of said electrostatic field whereby to serve as an electrically continuous boundary for said electrostatic field, the axial spacing of said conductive member from said effective deflection center being approximately in the range of 0.40 to 0.75 times the spacing of said effective deflection center from said target.

11. An electron beam tube having an electron beam source and a target spaced from said source along a reference axis, means for deflecting the electron beam in directions normal to the axis from an effective deflection center, cylindrical spiral electrode means of non-uniform pitch surrounding the axis for generating an electrostatic field having equipotential surfaces which are coasymptotic hyperboloids symmetrical with the axis, an electron beam transparent conductive member disposed in the path of the electron beam between the deflection means and said electrostatic field, said conductive member conforming in shape generally to the adjacent hyperboloidal equiptotential surface of said electrostatic field whereby to serve as an electrically conductive boundary for said electrostatic field, the axial spacing of said conductive member from said effective deflection center being approximately 0.56 the spacing of said effective deflection center from said target.

12. In a cathode ray tube having an envelope including electron beam generating means, an electron beam target and deflection means for deflecting the generated electron beam in directions perpendicular to a reference axis, a cylindrical spiral anode extending along and in surrounding relations with said reference axis between said deflection means and said target, said spiral anode having a progressively varying resistance per unit length of displacement along said axis and means for supplying potentials to said spiral anode such as to generate an electrostatic field therewithin having a space potential which varies along said axis in accordance with the expression $$V_z = V_3 + (V_4 - V_3)\left[\frac{2z}{l} - \left(\frac{z}{l}\right)^2\right]$$

where $V_3$ is the potential at the beginning of the spiral,
$V_4$ is the potential at the end of the spiral, and
$l$ is the axial length of the spiral, and
$z$ is displacement along the axis from a position corresponding to the beginning of the spiral.

13. In a cathode ray tube having an envelope including electron beam generating means, an electron beam target, and deflection means for deflecting the generated electron beam in directions perpendicular to a reference axis, a cylindrical spiral anode extending along and in surrounding relation with said reference axis between said deflection means and said target, said spiral anode comprising a series of incremental spiral conductive strips each having a respective constant pitch, said respective pitches changing progressively from one end of said spiral to the other.

14. An electron discharge device comprising means for generating an electron beam having electrons moving with substantially uniform velocity along a reference axis, a target adapted to be bombarded by said electron beam, deflection means beween the beam generating means and target for deflecting the beam orthogonally with respect to the axis from an effective deflection center on the axis, a cylindrical support between the deflection means and target and disposed coaxially with the reference axis, a spiral conductor on the support having a first potential at one end and a second potential at the other end and a variable resistance per unit displacement along said axis such that the potential intermediate the ends of said spiral varies as the square of displacement along said axis, a partition extending generally transverse to said axis at the electron beam entrance end of said cylinder, said partition being foraminate and being shaped to conform to that hyperboloidal equipotential surface of the field generated by said spiral which intersects said axis coincidently with said partition, said partition having a first conductive surface facing said target and having the same potential as said hyperboloidal equipotential surface, said partition having a second conductive surface facing away from said target and provided with a potential slightly above that of the first conductive surface.

15. A cathode ray tube comprising means for generating an electron beam coaxial with a reference axis, electron beam deflection means for deflecting the beam relative to said axis from an effective deflection center on said axis, a tubular conductive member surrounding the axis and through which the electron beam is adapted to pass after deflection, said conductive member having a constant potential interior surface defining a substantially field free space for passage of the electron beam therethrough, a focusing and accelerating region having a cylindrical boundary coaxial with said reference axis, a spiral anode coincident with the cylindrical wall of the focusing and accelerating region and having a potential along said spiral varying in proportion to the square of displacement along said axis, and an electron transparent conductive member disposed generally transverse to the axis at the end of said tubular conductive member from said beam generating means, said electron transparent member coinciding in shape with that hyperboloidal equipotential surface of the field of said focusing and accelerating region which intersects said axis tangent to said electron transparent member, and an electron beam target disposed generally transverse to said axis at the end of said focusing and accelerating region remote from said electron beam generating means.

16. A cathode ray tube having an electron beam source and a target spaced from said source along a reference axis, cylindrical nonlinear spiral electrode lens means surrounding said axis for generating an electrostatic field whose voltage profile along the said axis includes a substantially parabolic curve ranging from a maximum positive potential at one end of said spiral electrode to an intermediate minimum potential to a final maximum positive potential at the other end of said spiral electrode, a first electron beam apertured conductive member disposed transversely in the path of the said electron beam adjacent to said spiral electrode and between said electron beam source and said electrostatic field, a second apertured conductive member disposed transversely in the said path of said electron beam adjacent said spiral electrode and between said spiral electrode and said target, said conductive members conforming in shape generally to the adjacent equipotential surface of said electrostatic field to serve as electrically conductive boundaries for said electrostatic field.

17. The invention as recited in claim 16 wherein said spiral electrode comprises a pair of spiral sections, each of said spiral electrode sections having similar nonlinearity, said spiral electrode sections arranged in axial adjacent relationship with the said non-uniform linearity being progressively non-uniform in opposed directions so that an electron beam focusing result is achieved.

18. A high resolution cathode ray tube comprising in combination,
  (a) an envelope structure having a narrow neck section and a screen section arranged in adjacent axial relationship about a central axis,
  (b) electron beam means in the neck section of said tube to provide a flow of electrons to said screen,
  (c) a hollow support means positioned coaxially within said neck section in spaced lateral relationship therefrom,
  (d) a non-linear spiral electrode lens means positioned on said hollow support member coaxially therewith and extending along the wall thereof,
  (e) the non-linearity of said spiral electrode means being predetermined to provide an electrostatic field whose voltage potential along said axis includes a parabolic curve,
  (f) an electron beam apertured conductive member disposed transverse to said axis adjacent said spiral electrode and between said spiral electrode and said screen,
  (g) and beam deflection means positioned between said conductive member and said screen.

(References on following page)

References Cited in the file of this patent

UNITED STATES PATENTS

| | | | |
|---|---|---|---|
| 2,080,449 | Von Ardenne | May 18, | 1937 |
| 2,110,911 | Knoll et al. | Mar. 15, | 1938 |
| 2,123,636 | Schwartz | July 12, | 1938 |
| 2,124,270 | Broadway | July 19, | 1938 |
| 2,141,414 | Schlesinger | Dec. 27, | 1938 |
| 2,156,813 | Kautz | May 2, | 1939 |
| 2,185,283 | Weinhart | Jan. 2, | 1940 |
| 2,225,917 | Mahl | Dec. 24, | 1940 |
| 2,227,097 | Lubsynski | Dec. 31, | 1940 |
| 2,264,624 | Dillenburger | Dec. 2, | 1941 |
| 2,296,355 | Levin | Sept. 22, | 1942 |
| 2,312,723 | Llewellyn | Mar. 2, | 1943 |
| 2,313,018 | Krause | Mar. 2, | 1943 |
| 2,408,809 | Pierce | Oct. 8, | 1946 |
| 2,466,065 | Weichardt | Apr. 5, | 1949 |
| 2,469,843 | Pierce | May 10, | 1949 |
| 2,520,813 | Rudenberg | Aug. 29, | 1950 |
| 2,547,415 | Silverman | Apr. 3, | 1951 |
| 2,569,154 | Donath | Sept. 25, | 1951 |
| 2,630,544 | Tiley | Mar. 3, | 1953 |
| 2,714,679 | Van De Graff et al. | Aug. 2, | 1955 |
| 2,728,872 | Smith | Dec. 27, | 1955 |
| 2,740,919 | Fleming | Apr. 3, | 1956 |
| 2,766,398 | Orthuber | Oct. 9, | 1956 |
| 2,776,389 | Peter | Jan. 1, | 1957 |
| 2,899,594 | Johnson | Aug. 11, | 1959 |
| 2,915,660 | McNaney | Dec. 1, | 1959 |
| 2,922,921 | Nygard | Jan. 26, | 1960 |
| 2,981,864 | Burdick | Apr. 25, | 1961 |
| 2,986,672 | Vaccaro et al. | May 30, | 1961 |

FOREIGN PATENTS

| | | | |
|---|---|---|---|
| 67,204 | France | June 3, | 1957 |
| 967,886 | France | May 31, | 1950 |
| 672,292 | Great Britain | May 21, | 1952 |
| 735,463 | Great Britain | Aug. 24, | 1955 |
| 192,232 | Switzerland | Oct. 1, | 1937 |

OTHER REFERENCES

"The Type C19K Charactron Tube and Its Applications to Air Surveillance Systems," by Joseph T. McNaney, Chief Engineer, Charactron Project Convair, Division of General Dynamics, San Diego, Calif., 1955 (page 35 relied on).